April 13, 1954     E. ZOLL     2,674,907
DRILL JIG
Filed July 1, 1952
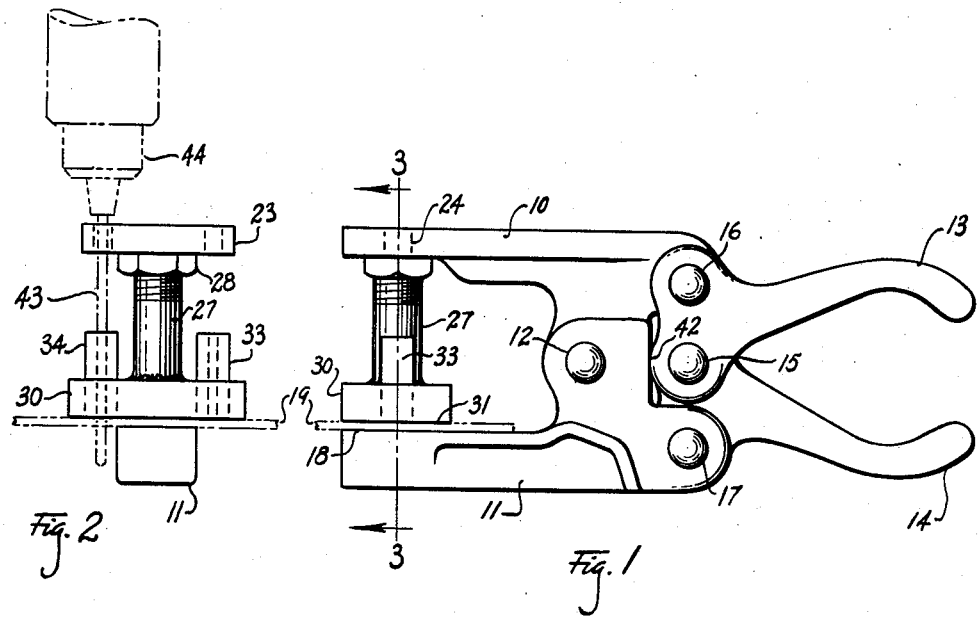
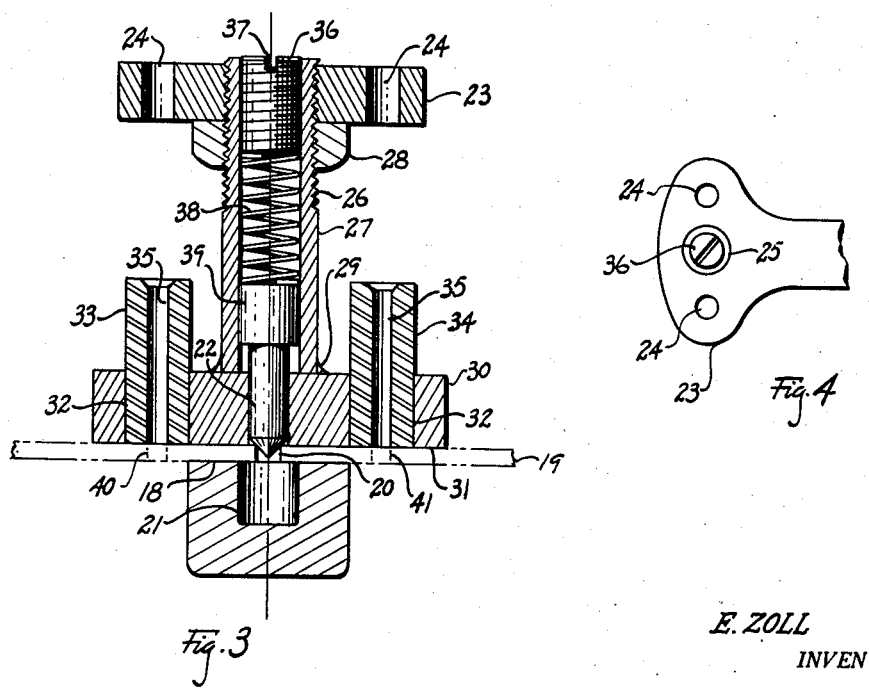
E. ZOLL
INVENTOR.
BY *S. Tierney Jr.*
ATTORNEY Patented Apr. 13, 1954

2,674,907

UNITED STATES PATENT OFFICE 2,674,907

DRILL JIG

Earl Zoll, Chula Vista, Calif., assignor to Rohr Aircraft Corporation, Chula Vista, Calif., a corporation of California Application July 1, 1952, Serial No. 296,612

6 Claims. (Cl. 77—62)

This invention relates to a drill jig for the drilling of holes in a workpiece.

It is an object of the invention to provide a drill jig which may be easily and quickly attached to or detached from a workpiece in which a hole or holes are to be drilled.

A further object is to provide a combination clamp and drill jig in which indexing means is used to insure the clamping of the jig to the workpiece accurately at the desired position where the holes are required.

Another object is to provide adjustable means to accommodate the clamping of the jig to workpieces of a wide range of thickness.

Further objects will become apparent as the description of the drill jig proceeds. For a better understanding of the invention, reference is made to the accompanying drawing, in which:

Figure 1 is a side view of a clamp and attached drill jig embodying the invention;

Figure 2 is an end view of the drill jig shown in Figure 1;

Figure 3 is a cross section taken through line 3—3 of Figure 1 on an enlarged scale, and Figure 4 is a top view showing a portion of the clamp.

The illustrated embodiment of the invention comprises an upper arm 10 connected to a lower arm 11 by pivot pin 12 and a pair of handles 13, 14 pivoted together by a pin 15 and connected to the arms by pivot pins 16, 17. Each of the pivot pins referred to may be a rivet which serves to hold the parts together in assembled relation. The lower arm has a flat gripping surface 18 adapted to grip the lower surface of a workpiece illustrated as a strip of sheet metal 19 having a preformed cylindrical hole 20. The purpose of the jig illustrated in the drawing is to locate the drilling of two additional holes in sheet 19 for the purpose of attaching a nut plate of known type (not shown) to the sheet by a pair of rivets entered through the additional holes. When a screw passing through hole 20 is then entered in the nut on such plate and rotated, the nut plate holds the nut in position against rotation.

Surface 18 is recessed at 21 to receive the end of an indexing pin 22 to be described later.

The upper arm 10 is flared out to provide a wide end portion 23 through which holes 24 are drilled and intermediate these is a tapped hole 25 in which a screw thread 26 provided on the sleeve 27 is screwed, the sleeve being locked in place on arm 10 by a lock nut 28. Secured, as by welding 29, to the end of sleeve 27 is a plate or jaw 30 having a flat gripping surface 31 parallel to surface 18 and the axis of pivot 12. Plate 30 is provided with a pair of drilled cylindrical holes 32 adapted to snugly receive two removable drill bushings 33, 34. Each drill bushing has a reamed cylindrical hole 35 whose axis is in alignment with the axis of a hole 24 when the clamp is closed on the workpiece. At its upper end sleeve 27 is interiorly threaded to receive a threaded adjusting screw 36 having a slot 37 adapted to receive the end of a screw driver. Screw 36 engages the upper end of a compression spring 38 whose lower end engages the cylindrical head 39 of pin 22, head 39 being slidable along the interior wall of sleeve 27.

In using the jig to drill two holes 40, 41 in sheet 19, the sheet is held between arm 11 and jaw 30 and the tapered end of indexing pin 22 inserted into hole 20 in the sheet, the tapered end of the pin bearing against the peripheral wall of hole 20 to index the jig in proper position. Upon the operator grasping handles 13, 14 by one hand and forcing them together into the position shown in Figure 1, the sheet is firmly held by the gripping surfaces 18 and 31 and the clamp locked by the centers of pivot pins 15, 16 and 17 coming into substantial alignment and also an intermediate point 42 on handle 13 coming into engagement with arm 11. When a drill 43 held in the chuck 44 of a portable electric drill is then passed through a hole 24 and into bushing 33, it is guided by the bushing to cut the hole 40 at the proper position in sheet 19. The engagement of the drill chuck 44 with upper arm 10 prevents the drill from advancing too far and possibly injuring a portion of the workpiece lying under the hole 40. The drill is then withdrawn and inserted in the other hole 24 and bushing 34 to drill the hole 41. Upon separating the handles 13, 14 the gripping surfaces 18 and 31 spread apart and the clamp may be withdrawn from the workpiece.

To drill holes of larger or small diameter, the bushings 33, 34 are removed and replaced by others of the same outside diameter and having central holes of the proper diameter. To drill a thicker workpiece, locknut 28 is loosened and the assembly including sleeve 27 and jaw 30 rotated to advance the thread 26 further into threaded opening 25 a sufficient distance to bring the axes of bushings 33, 34 into alignment with the axes of holes 24 and provide a suitable distance between the gripping surfaces to grip the workpiece when the clamp is closed. Locknut 28 is then tightened to lock the parts in position.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A combined clamp and drill jig comprising, in combination: an upper arm having a hole therethrough adapted to freely pass a drill; a lower arm having a flat gripping surface; means pivotally supporting said arms; a support depending from said upper arm and having a flat gripping surface; a drill bushing secured to said support and having a cylindrical drill guiding surface disposed under said hole; and a pair of handles connected to said arms and adapted to be grasped by a hand of the operator, the movement of said handles toward each other causing a workpiece disposed on said lower arm to be firmly gripped by said gripping surfaces and held for cutting at a desired point by a rotary drill advancing along the drill guiding surface.

2. The combination claimed in claim 1; in which the lower end of the drill bushing is substantially in the plane of the gripping surface of said depending support.

3. A combined clamp and drill jig comprising, in combination: an upper arm having a vertical hole therethrough; a vertically adjustable support depending from said arm, said support having an upper end disposed in said hole and a lower portion terminating in a first gripping surface; means for securing said support at any desired elevation on said arm; a lower arm having a flat gripping surface disposed opposite said first gripping surface; means pivotally supporting said arms; a drill bushing on said support at a distance to one side of said hole and having a vertical drill guiding surface; said upper arm having a portion at a level above the top of the drill bushing arranged to limit the downward movement of the drill and a pair of handles pivotally connected to said arms and adapted to be grasped by the hand of an operator, the movement of said handles toward each other causing a workpiece disposed between said gripping surfaces to be firmly gripped thereby and held for cutting at a desired point by a rotary drill advancing along the drill guiding surface.

4. A combined clamp and drill jig adapted to guide a drill for drilling a hole in a workpiece at a predetermined distance from a cylindrical hole preformed in the workpiece comprising, in combination: an upper arm having a screw threaded hole therein; a sleeve having an upper end in threaded engagement with said screw thread; a jaw secured to said sleeve having a first gripping surface and an opening in alignment with the interior of said sleeve; an indexing plunger slidable in said sleeve and having a lower portion extending through said opening and terminating in a conical end; means for biasing said conical end of said plunger into the preformed hole in the workpiece; a lower arm having a flat gripping surface disposed opposite said first gripping surface; means pivotally supporting said arms; a drill bushing secured to said jaw and having a drill guiding surface spaced from said sleeve; and a pair of handles pivotally connected to said arms and adapted to be grasped by the hand of an operator, the movement of said handles toward each other causing a workpiece disposed between said gripping surfaces to be firmly gripped thereby and held for cutting at a desired point by a rotary drill advancing along the drill guiding surface.

5. A combined clamp and drill jig comprising, in combination: an upper arm having a pair of spaced apart holes therethrough adapted to freely pass a drill; a lower arm having a first gripping surface; means pivotally supporting said arms; a depending support secured to said upper arm between said holes and having a gripping surface disposed opposite said first gripping surface; a pair of drill bushings secured to said support and having parallel cylindrical drill guiding surfaces disposed under said holes; an indexing member projecting from the lower face of said support; and a pair of handles connected to said arms and adapted to be grasped by the hand of the operator, the movement of said handles toward each other causing a workpiece to be firmly gripped by said gripping surfaces and held for cutting by a rotary drill advancing along said drill guiding surfaces in succession.

6. The combination claimed in claim 5; in which the lower arm is provided with a recess in its upper surface adapted to receive the lower end of said indexing member.

References Cited in the file of this patent

UNITED STATES PATENTS

| Number | Name | Date |
| --- | --- | --- |
| 2,422,114 | Matter | June 10, 1947 |